(No Model.) 3 Sheets—Sheet 3.
X. H. MARTINENT.
HARVESTER.

No. 356,655. Patented Jan. 25, 1887.

Witnesses,
Geo. H. Strong.
J. H. Towne.

Inventor,
H. H. Martinent
By Dewey & Co.
attys

UNITED STATES PATENT OFFICE.

XAVIER H. MARTINENT, OF FISH LAKE VALLEY, NEVADA.

HARVESTER.

SPECIFICATION forming part of Letters Patent No. 356,655, dated January 25, 1887.

Application filed August 31, 1885. Serial No. 175,855. (No model.)

*To all whom it may concern:*

Be it known that I, XAVIER H. MARTINENT, of Fish Lake Valley, county of Esmeralda, and State of Nevada, have invented an Improvement in Harvesters; and I hereby declare the following to be a full, clear, and exact description thereof.

My invention relates to that class of harvesters known as "headers;" and my invention consists in the mechanism for adjusting the draper-platform, and in the driving mechanism for the draper and sickle adapted to adjust itself to the movement of the draper-platform, all of which I shall hereinafter fully describe.

The object of my invention is to provide a simple and effective means for adjusting the draper-platform for a high or low cut, as may be desired, and to provide suitable driving mechanism to adapt itself to the adjustment of the platform.

Figure 1:
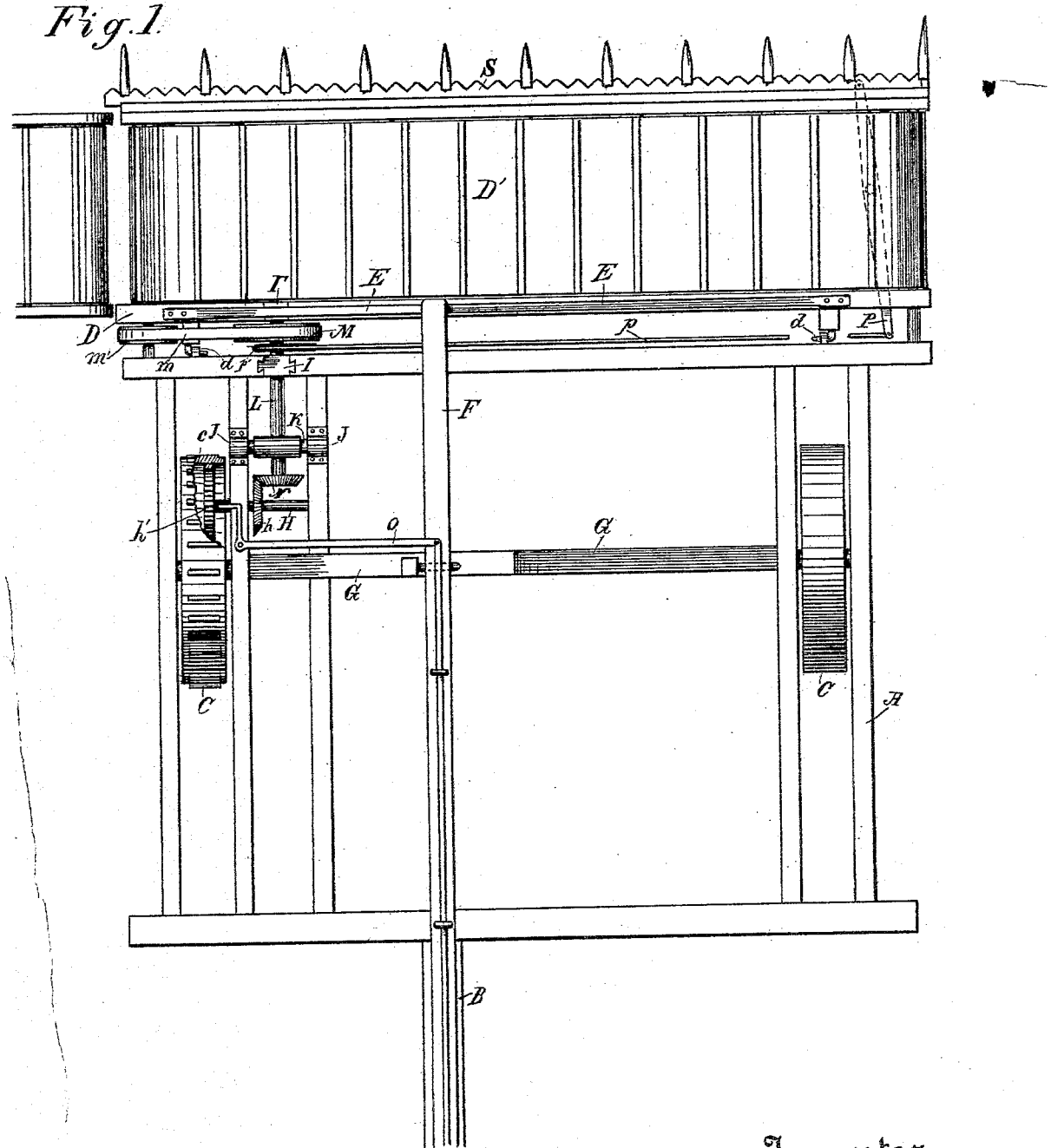
Figure 2:
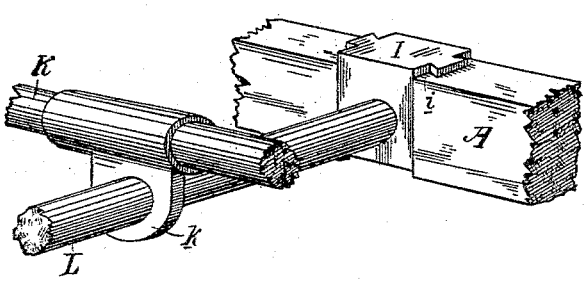
Figure 3:
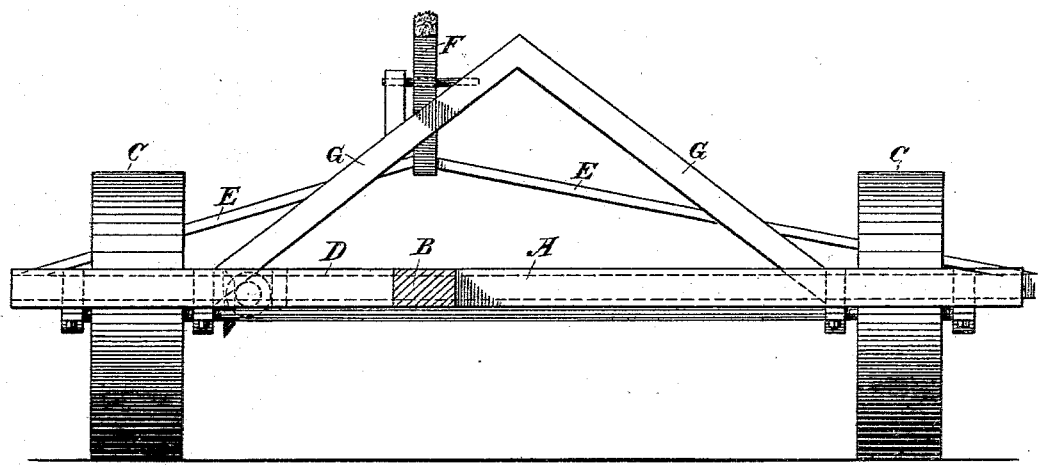
Figure 4:
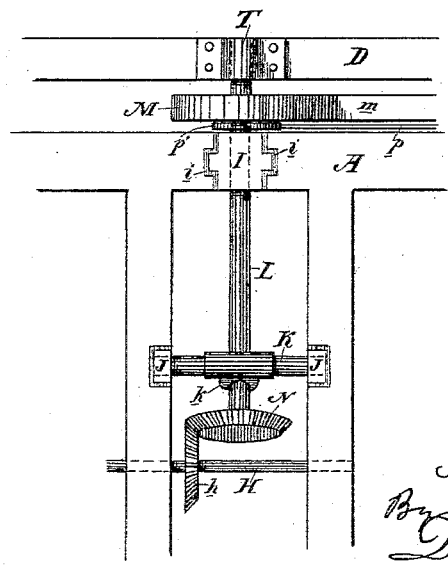

Referring to the accompanying drawings, Figure 1 is a plan of my harvester. Fig. 2 is a detail showing shafts L and K. Fig. 3 is a rear view, and Fig. 4 is a detail showing the boxes I and J and the shafts K and L and their adjuncts.

A is the main frame of the header, and B is the push-beam.

C are the wheels on which the frame is mounted, the left-hand wheel being here shown as the bull or driving wheel.

D is the draper-platform, D' the draper, and S the sickle.

The draper-platform is hinged to the front bar of the main frame by hinges $d$. On the rear bar of this platform are firmly secured at their lower ends bars or strips E, which incline upwardly and converge to the point, where their upper ends are secured to the forward end of the operating-lever F, the attachment of said bars and lever being a loose one.

G are two bars, which are secured to the main frame of the header and incline upwardly, converging, as shown, and meeting at their upper ends about in the plane of the longitudinal center of the machine. On one of these bars the operating-lever F rests, and is fulcrumed, as shown. By moving the lever F the draper-platform is adjusted to the elevation desired.

The draper D' is driven by the following mechanism:

H is a short counter-shaft journaled in one side of the header-frame, and having on its outer end a gear, $h'$, which engages an annular gear-band, $c$, on the inner surface of the bull-wheel C. The shaft H carries also a bevel-gear, $h$. In the front bar of the main header-frame is a box, I, which is adapted to have a vertical adjustment, sliding freely up and down in guides or runners $i$, bolted to the front bar, as shown in Fig. 4. In the side bars of the frame is journaled in the boxes J a short rock-shaft, K, which is held in position by suitable guides or runners, and carries a box, $k$, in which is journaled a shaft, L. The forward portion of this shaft is journaled in the vertically-adjustable box I, its extreme forward end being journaled and held in position by a box, T, on the rear bar of the draper-platform. The shaft L therefore rises with the platform, moves with box I, and rocks with shaft K.

M is a pulley on shaft L, from which a belt, $m$, extends to a pulley, $m'$, on one of the draper-drums. The rear end of the shaft carries a bevel-gear, N, which meshes with the bevel-gear $h$ on the counter-shaft H.

It will be observed that as the draper-platform is moved up and down the shaft L moves with it, rising with the box I, and turning slightly with the rock-shaft K, whereby its gear N is still held to its engagement with the bevel-gear $h$.

O is the usual rod by which the power-transmitting mechanism is thrown into and out of gear with the bull-wheel C.

P is a pivoted lever or pitman, by which the sickle S is driven, motion being transmitted to said pitman by a rod, $p$, to which a reciprocating movement is imparted by any suitable mechanism from the shaft L, as by an eccentric, $p'$.

Having thus described my invention, what I claim as new, and desire to secure by Letters Patent, is—

1. In a harvester, the adjustable draper-platform D, hinged to the main frame, and the draper D' thereon, in combination with the draper-driving mechanism consisting of the shaft L, having pulley M and bevel-gear N, the vertically-adjustable box I, the rock-shaft K, journaled in the main frame and carrying the sleeve K', having box $k$, and the box T, in which the forward end of the shaft L is journaled, the counter-shaft H, deriving power from the bull or driving wheel of the main frame, and having bevel-gear $h$, meshing with the gear N, and the belt $m$ and the pulley $m'$ on the draper-drum, substantially as herein described.

2. In a harvester, the adjustable platform D and the sickle S, in combination with the means by which the sickle is driven, consisting of the pitman P, the rod $p$, and the shaft L, having eccentric $p'$, and bevel-gear N, the vertically-adjustable box I, rock-shaft K, journaled in the main frame and carrying the sleeve K', having box $k$, and the box T, in which the forward end of the shaft is journaled, and the counter-shaft H, deriving power from the bull or driving wheel, and having pinion $h$, meshing with pinion N, substantially as herein described.

3. In a harvester, the adjustable draper-platform D, the draper D', and the sickle S, in combination with the mechanism by which the draper is driven and the sickle-driving pitman reciprocated, consisting of the shaft L, having pulley M, eccentric $p'$, and bevel-gear N, the vertically-adjustable box I, rock-shaft K, journaled in the main frame and carrying the sleeve K', having box $k$, and the box T, in which the forward end of the shaft is mounted, the counter-shaft H, deriving power from the bull or driving wheel, and having bevel-gear $h$, meshing with gear N, the belt $m$ and pulley $m'$ on the draper-drum, the pitman P, and the rod $p$, extending from the eccentric to the pitman, substantially as herein described.

In witness whereof I have hereunto set my hand.

X. H. MARTINENT.

Witnesses:
  LOUIS MARRATTE,
  PETER GEMUR.